United States Patent [19]

Gabris et al.

[11] Patent Number: 4,755,967
[45] Date of Patent: Jul. 5, 1988

[54] PROGRAMMABLE SYNCHRONOUS SEQUENTIAL STATE MACHINE OR SEQUENCER HAVING DECISION VARIABLE INPUT MAPPING CIRCUIT RESPONSIVE TO FEEDBACK SIGNALS

[75] Inventors: Joseph Gabris, Newbury, United Kingdom; Vincent J. Coli, Mountain View, Calif.; Paul A. Dennig, Sunnyvale, Calif.; Mark E. Fitzpatrick, San Jose, Calif.; Sai-Keung Lee, Sunnyvale, Calif.

[73] Assignee: Monolithic Memories, Inc., Santa Clara, Calif.

[21] Appl. No.: 842,505

[22] Filed: Mar. 21, 1986

[51] Int. Cl.⁴ ............................................. G06F 9/26
[52] U.S. Cl. ................................................. 364/900
[58] Field of Search ............... 364/200, 900 MS File, 364/716, 130, 131, 133

[56] References Cited

U.S. PATENT DOCUMENTS

| | | | |
|---|---|---|---|
| 3,978,454 | 8/1976 | Willard | 364/900 |
| 4,019,175 | 4/1977 | Nakao | 364/900 |
| 4,254,474 | 3/1981 | Cooper et al. | 364/900 |
| 4,370,729 | 1/1983 | Bosch | 364/900 |
| 4,407,015 | 9/1983 | Ziobro | 364/200 |
| 4,510,580 | 4/1985 | Yomogida et al. | 364/900 |
| 4,519,033 | 5/1985 | Vaughn et al. | 364/900 |
| 4,627,025 | 12/1986 | Ninnemann et al. | 364/900 |

OTHER PUBLICATIONS

Jacob Millman, "Microelectronics; Digital and Analog Circuits and Systems", 1979, pp. 196, 285.

*Primary Examiner*—Archie E. Williams, Jr.
*Assistant Examiner*—Emily Y. Chan
*Attorney, Agent, or Firm*—David W. Heid; Alan H. MacPherson; Paul J. Winters

[57] ABSTRACT

A programmable sequencer 10 uses an input mapping circuit 20 including a programmable logic array 30 to map decision variable input conditions onto branch address signals, which are used with primary address signals to form a next state address for state word memory 50. Input mapping circuit 20 preferably includes a branch control circuit 40, controlled by feedback signals from the output of state word memory 50, to selectively transform branch address signals to allow different states to use state word locations sharing the same primary address in state word memory 50. The preferred embodiment also includes a diagnostic circuit 80 useful for programming, and/or diagnosing operation of, sequencer 10.

5 Claims, 4 Drawing Sheets

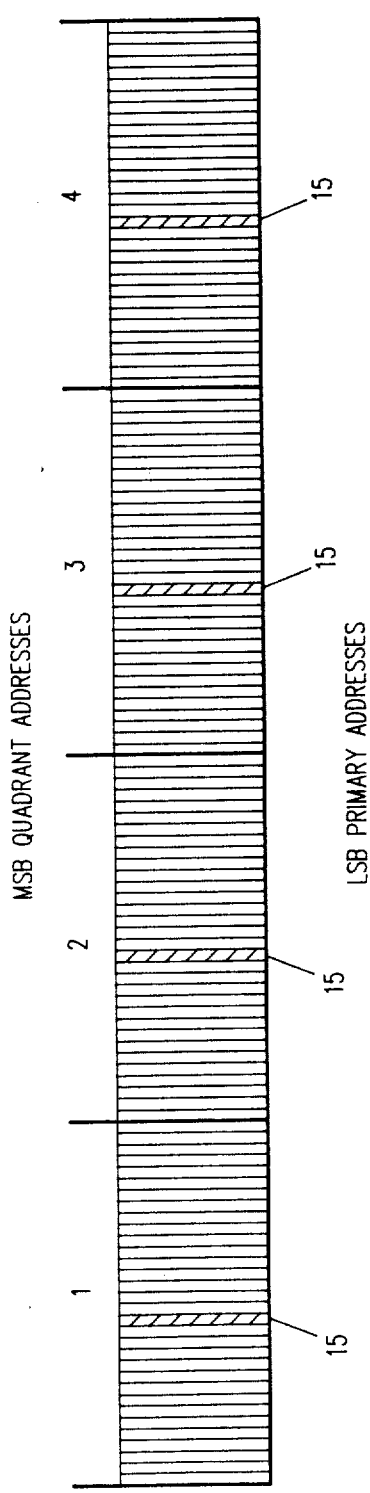
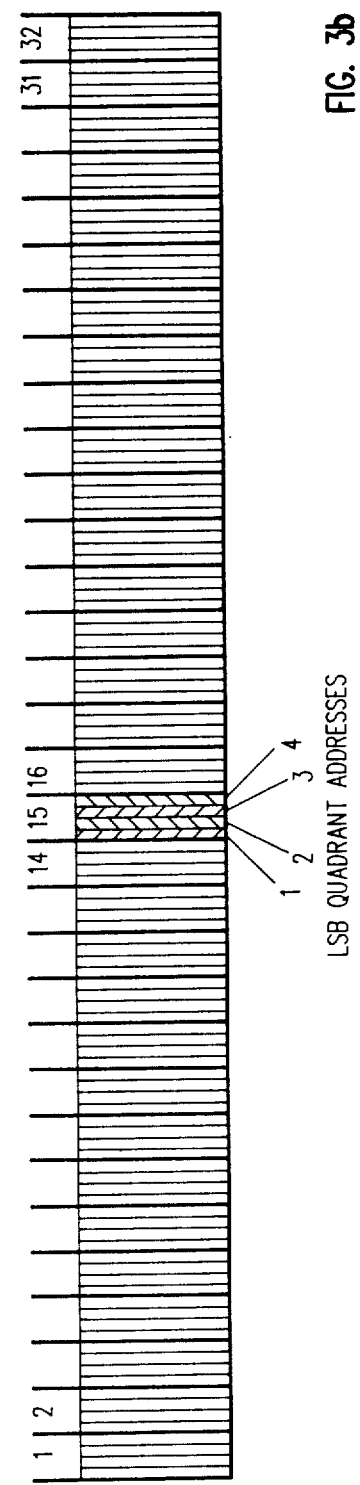

PROGRAMMABLE SYNCHRONOUS SEQUENTIAL STATE MACHINE OR SEQUENCER HAVING DECISION VARIABLE INPUT MAPPING CIRCUIT RESPONSIVE TO FEEDBACK SIGNALS

BACKGROUND OF THE INVENTION

This invention relates to logic circuits, and more specifically to a Mealy or Moore type synchronous sequential state machine.

A state machine cycles through a sequence of possible states, dependent upon decision variable signals input to the state machine during successive states. Referring to FIG. 1, a simplified prior art state machine 2 includes a combinatorial logic network 4 (for example, a memory) and a feedback register 6. Signals received at (for example, memory address) input terminals 3 are transformed in combinatorial logic network 4, which is configured according to a user-supplied sequential function, to produce state word output signals at network 4 output terminals 5. The "present state" of state machine 2 is defined by the value of the state word output signals, comprised of data signals, which are applied through buffer 8 to state machine output lines 9, and feedback signals, which are transferred through timed feedback register 6 to feedback lines 7. Present state feedback signals generally change the values of signals input to terminals 3 of logic network 4, and thereby causing the state machine to undergo a transition from its present state to its "next state". Next state transitions are determined as a function of one or more present state feedback signals, either conditionally with decision variables received from external devices (not shown), or unconditionally independent of decision variable conditions.

Synchronous sequential state machines are distinguished as Mealy type machines, in which, referring to FIG. 1, network 4 output data signals pass immediately through buffer 8 to state machine output terminals 9, and thus are determined by present conditions or values of decision variables at network input terminals 3, or as Moore type machines, in which network 4 output data signals are delayed at the input terminals of buffer 8 (which may be equivalent to timed feedback register 6) until the next period of timing signal CLK, when data signals are transferred to state machine output terminals 9. Thus, Moore machine data outputs are determined by previous decision variable input conditions.

Synchronous sequential type state machines execute ongoing sequences, without ending states, and, while supplied with power, can only "stop" by circling through states in a loop, either endlessly, for example in an "error trap," or until a decision variable input condition changes and branches the state machine to a new state, outside of the loop. Synchronous sequential state machines (or "sequencers") are commonly used, for example, as small controllers to drive industrial machinery, in computer systems to manage communication buses, memories, or peripheral devices, or to encode or decode data.

The capabilities of a sequencer circuit are determined by its input capacity (i.e. the number of input decision variables it receives from external devices), output capacity (i.e. the number of data output signals it provides to external devices), feedback capacity (i.e. the number of feedback variables), number of states, and state transition or branching capabilities, speed, and efficiency. Small arbitration controllers (used for example to arbitrate access to a single communication bus by one of several devices) typically execute sequences of from 3 to 40 states, each state capable of branching to a next state among a typical maximum of up to 16 possible next states.

The uses of a sequencer formed as an integrated circuit (IC) are limited by the availability of input and output (I/O) terminals. A limited-output sequencer may only be able to implement certain functions by supplying encoded data signals, which are decoded by an external circuit to provide the desired data output signals. Similarly, decision variable input capacity of the sequencer limits the number of conditions for branching. Decision variable signals may have to be encoded before application as input signals to a limited-input sequencer. Externally encoding decision variable input signals and/or decoding data output signals through other circuits increases the size, power, complexity, and cost, and decreases the speed, of a sequencer. Therefore it is preferable to have a large decision variable input capacity.

Decision variable input signals can be transformed by a combinatorial logic network 4 comprising an addressable memory, which is enabled to output state words. A set of N binary decision variables has a range of $2^N$ values or combinations, each combination's values potentially representing a distinct decision variable input condition, which determines the transition or branch to the next state, or address of one of $2^N$ state word memory locations. However, practical sequencers which test N decision variables commonly have no state transition dependent upon all N variables. Instead, the maximum number of decision variables relevant to any one state transition is Rmax. This leaves at least $N - Rmax = D$ irrelevant decision variables for every state transition, which are evaluated by an address decoder branching to a different memory location, which must store the same state word value, for each of the $2^D$ irrelevant variable combinations possible with each combination of the Rmax relevant variables. Thus, a sequencer using an N bit address decoder wastes at least $2^N - 2^{Rmax}$ state word memory locations for each state transition.

This waste of state word memory capacity is avoided in prior art sequencers using feedback signals controlling multiplexers (MUXs) to select only Rmax decision variables for use in determining the address in a state word memory containing the next state word. In this event, to form a next state address for a state having less than Rmax relevant decision variables, the MUX must also select one or more irrelevant decision variables to complete the Rmax bit address. Rmax decision variable input signals have a range of $2^{Rmax}$ values or addresses. However, typical sequences include many states in which one or more sets of several decision variable conditions yield the same next state branch or branches, and for any state in the sequence, even those states with Rmax relevant decision variables, the maximum number of sets of input conditions, or actual branches Amax, is no more than $2^{Rmax-P}$, for a positive integer $P < Rmax$. In this event, the actual branch condition sets can be mapped onto, or relabelled by, $C = Rmax - P$ new binary variables, requiring only $2^C$ state word memory address locations for defining the possible next state branches from any present state.

Still, unconditional, and many conditional, next state transitions require fewer than $Amax = 2^C$ branch addresses. In prior art sequencers, despite reducing the $2^N$ possible decision variable combinations, by selecting only Rmax decision variable input lines, and by mapping branch condition sets onto only C bit branch addresses, state word memory addresses reserved for, but not used by, states with less than $2^C$ possible next states, are wasted.

NASA Tech Brief Vol. 9, No. 2, Item 36 describes a sequencer which minimizes the number of next state addresses committed to each state by using feedback signals controlling a multiplexer to select only one decision variable input line from among N decision variable lines, for two-way branching in each state. The NASA sequencer can execute a "branch fan-out tree" to use $R>1$ decision variables serially, in R cycles, each cycle branching to one of a possible $E=2$ intermediate states, for branching to one of a total of $T=E^R$ possible next states. Each of the R cycles is, in effect another intermediate state, lengthening and delaying the sequence.

The proposal in "Word Reduction in Microprogrammed Controllers" pp. 161-173 of *Microprocessing and Microprogramming* No. 9, North-Holland Publishing Co. (1982), by Ditzinger and Beister, describes a circuit which uses two multiplexers to each select a decision variable input signal for $2^{Rmax}=4$ way branches in each state. Either of the multiplexers can be forced to select a fixed logical 1 or logical 0 input signal, thus reducing the number of bits, and the effective range, of the branch address signal. However, the use of MUXs severely limits the choice of decision variable combinations for providing branch conditions.

A single branch address can be formed for each set of decision variable conditions through the use of more elaborate circuits such as AMD, Inc., No. Am2910 controllers, or larger computer systems. The AMD controllers use a fixed (in contrast to programmable) logic configuration which is set up by micro-programmed instructions for each state to generate addresses. The AMD sequencers are unnecessarily complex for many small state machine implementations, and their decision variable input capacity is limited.

Signetics Inc. sequencer No. 82S105 avoids reserving for each state a constant number $2^C$ of branch addresses to be transformed by the combinatorial logic network, by using, instead of an address-decoder memory, a programmable logic array (PLA) in which, for each state, each combination of decision variable lines for each branch condition is connected, within the PLA, to the input leads of a respective product term AND gate. Product term AND gates specifically programmed for each branch condition are able to select just one next state address for each actual branch, in one mapping step, eliminating the need for an input selection circuit which selects only Rmax input decision variables before the mapping step. In each state, at least one true decision variable condition enables its associated AND gate to provide a high product term output signal, which is applied through programmed connections to selected OR gates to generate a state word output signal.

The 82S105 PLA-based sequencer can be programmed conveniently to enable any of its 48 product terms on any given combination of feedback and decision variable input signals, but it executes sequences only up to 48 states. However, sequencers in practice often require Amax equal to only a fraction of 48 branches. While a given decision variable condition is commonly used for branching from several states, in each state distinct branch addresses may need to be formed by a respective programmable input product term, which is costly, consumes more power, and requires more area in an integrated circuit. Software support capability to compile a state machine description, and to minimize the number of feedback signals and product terms, is limited, and it is not routinely evident whether a given PLA can implement a given sequential function.

Various algorithms are known for minimizing the number of states and branches in a sequence, but no ideal algorithm is known for forming branch addresses independently of the next state primary address, while making substantially complete use of an address decoder memory. There remains, therefore, a need for a sequencer in the form of a single integrated circuit which is simple and flexibly programmable to map decision variable input conditions onto actual branch addresses independently of the present state, and to make better use of state memory, and to do this for sequences having many states with few branches or for sequences having few states with many branches.

SUMMARY OF THE INVENTION

This invention provides a programmable synchronous sequential state machine or sequencer which uses a decision variable input mapping circuit to map program-defined combinations of up to N decision variable input signals onto C-bit branch address signals. The decision variable input mapping circuit comprises a programmable logic array (PLA) circuit, in which branch-condition combinations or subsets of up to $N=8$ decision variable input lines are programconnected to the input leads of respective product term AND gates in each of two sets of 8 AND gates. In each of the two sets, AND gates forming products of relevant combinations of decision variables are enabled, in any combination, by present state feedback signals. The PLA product terms which define sets of decision variable conditions indicating the same actual branch are mapped onto Amax=$2^C$ branch numbers, by being combined by respective fixed input OR gates, to form $C=2$ bit branch number signals, in any state independent of feedback primary address restrictions. The ability to use the same product term AND gate to select a given combination or subset of the total number of decision variable input lines, for use in any number of states, to determine the next state branch number, conserves product terms and programmable input AND gates, and is an advantage over PLA-based prior art sequencers. The branch number is combined with a feedback primary address for each state transition to form the next state address. The next state address is applied to an addressdecoding memory, which provides the next state word output signal.

While each state uses an address with C bits for branching to one among $2^C$ locations in the state word memory, even though some states have less than Amax branches, the present invention avoids the problem of wasting unused branches which occurs in prior art sequencers when a constant number of possible branches is specified for every state. In contrast to the prior art, one embodiment of this invention includes, in the decision variable input mapping circuit, a branch control circuit employing suitable means, such as exclusive OR (XOR) gates, to selectively alter branch ("quadrant") addresses, in response to branch control feedback signals. This makes possible substantially fuller use of state word memory locations, by allowing more than one state to use a given primary address as the address of a possible next state.

In the preferred embodiment of the invention, sequencer 10 is programmable via a diagnostic circuit, including a "shadow" register, which is used in a novel way allowing more than one array to be programmed in the same IC, either permanently for fuse arrays, or temporarily for EEPROM or random access memory (RAM) arrays. After programming, the diagnostic circuit can be used to control and observe signals in the arrays and on feedback lines internal to the IC for circuit testing.

BRIEF DESCRIPTION OF THE DRAWING

FIGS. 3a and 3b are memory address maps showing how primary address bits can be used as either the LSBs or the MSBs of the next state address to specify a set of corresponding memory locations available for branching to the next state, with either MSB or LSB branch address bits completing the next state address:

DESCRIPTION OF THE PREFERRED EMBODIMENTS

Figure 1:
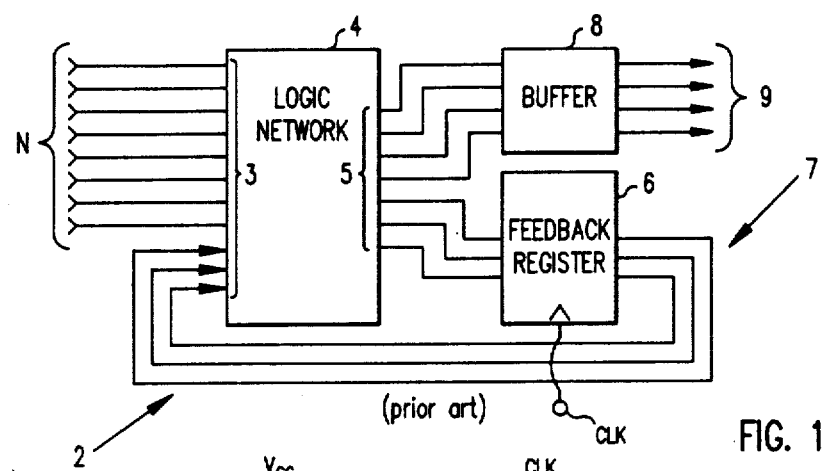
FIG. 1 is a schematic block diagram of a simplified state machine in which a combinatorial logic network provides data signals to an output buffer and provides feedback signals to a clocked register.
Figure 2:
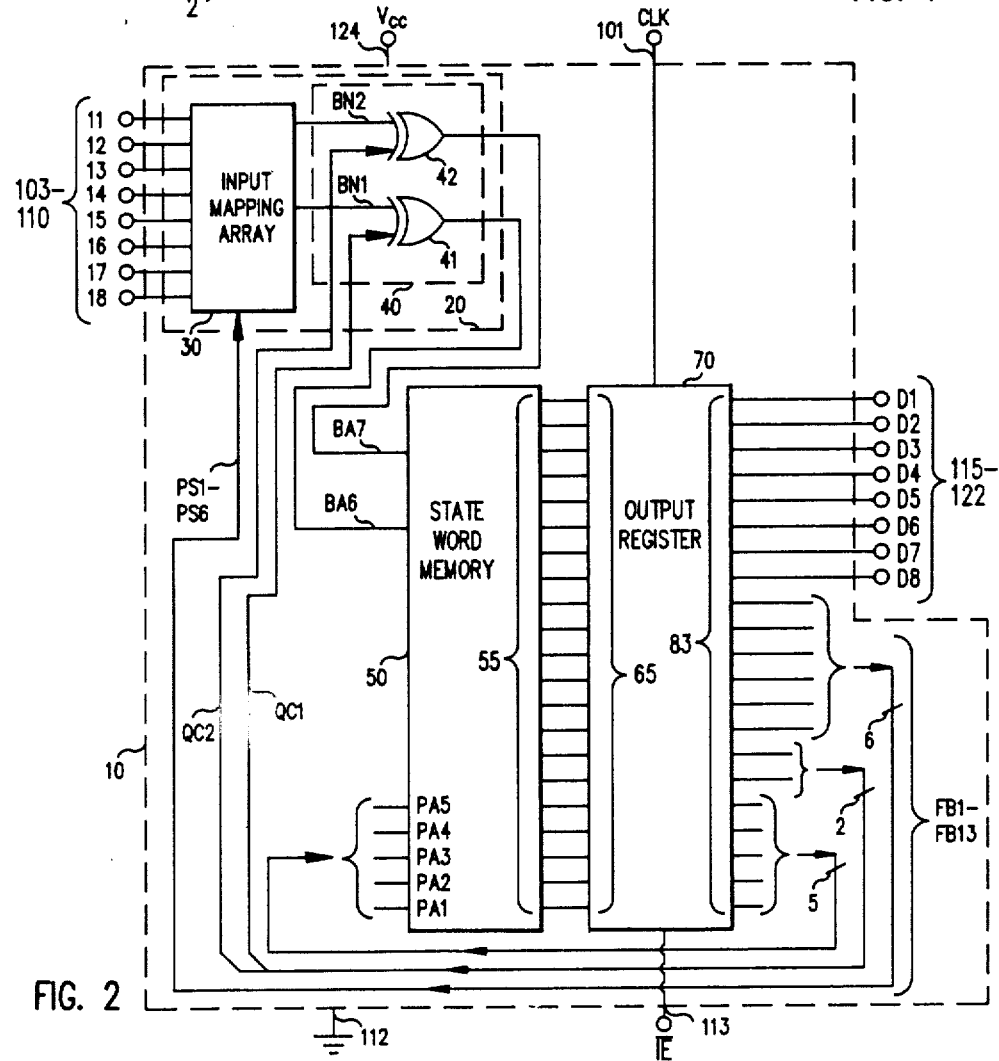
FIG. 2 is a schematic block diagram of input mapping circuit, state word memory, output register devices, and connecting lines forming the basis of a sequencer according to this invention.

One embodiment of the programmable sequencer of this invention is depicted as circuit 10 in FIG. 2. Sequencer 10. functions primarily as a Moore type state machine, although it can be used as a Mealy type state machine having data output signals D1 through D8 delayed by output register 70 until the next period of clock signal CLK Sequencer 10 has N=8 decision variable input terminals 103 through 110 for receiving decision variable input signals I1 through I8, respectively, at high level logical 1 voltages Vih of 3 volts and at low level logical 0 voltages Vil of 0 volts. Sequencer 10 also includes a decision variable input mapping circuit 20, a state word memory 50, and an output register 70. State word memory 50 is organized as 21 bit words at 128 addressable locations, which are programmed to store 21 bit state words defined by a user-supplied sequential function. A next state address signal applied to memory 50 address input lines PA1 through PA5, BA6, and BA7 causes memory 50 to output the next state word onto memory output lines 55. Rising edges of timing signal CLK on line 101 transfer the next state word from memory output lines 55 in parallel to input lines 65 of output register 70, which is composed of D-type flip flops, from which 21 output lines 83 provide signals, defining the "present state" of sequencer 10, on sequencer data output lines 115 through 122, and on feedback lines FB1 through FB13 to input mapping circuit 20 and state word memory 50. The feedback lines include 5 primary address lines PA1 through PA5, and 8 decision variable input mapping control lines. Mapping control lines include 6 decision variable product select lines PS1 through PS6 (to control input mapping array 30), and C=2 quadrant control lines QC1 and QC2 (to control circuit 40). The total of W=21 bits forming each state word can be arranged in any defined order as desired for storage in the bit locations at an address in state word memory 50. The distribution of the 21 state word bits and output lines in FIG. 2 is for the sake of clarity. In actual ICs, primary and branch address bits, state word bits, and state word memory output lines may be redistributed for topographical considerations, as is apparent to one of ordinary skill in the art.

Decision variable input mapping circuit 20 includes a decision variable input mapping array 30 such as a Monolithic Memories, Inc., programmable array logic circuit 16H2, having 14 input lines with phase splitters (not shown) which provide true and complementary decision variable or "literal" input signals I1, $\bar{I}1$, I2, $\bar{I}2$, ..., I8, $\bar{I}8$.

Decision variable product select lines PS1 through PS6 control input mapping array 30 to select $C'2$ sets each containing one or more logical products of programmed combinations of decision variable literal input lines for signals, to be ORed together, for input mapping array 30 to provide C=2 branch number signals on array output lines BN1 and BN2. In other embodiments, C can be a number other than 2, for 8-way branching when C=3, for example. If desired, array 30 can be programmed to select "combinations" of just one decision variable input line, for operation as a MUX.

A product term representing the logical product, or condition, of a given combination, or subset, of the true and complementary N decision variable input lines can be provided by the same product term AND gate in array 30, selected by signals on product select feedback lines PS1 through PS6, independently of signal values on next state primary address feedback lines PA1 through PA5. The ability to use the same product term AND gate to select a given combination or subset of the total number of decision variable input lines, for use in any number of states, to determine the next state address, conserves programmable input product term AND gates, and is an advantage over prior art PLA based sequencers.

Referring to FIGS. 3a and 3b, branch number signals BN1 and BN2 provide branch ("quadrant" since $2^C=4$) address bits of any defined significance, for example, the most significant bits (MSBs), while primary address signals provide the remaining least significant bits (LSBs) as shown in FIG. 3a. Alternatively, the branch address bits can be used as any other defined bits, such as the LSBs while the primary address bits are used as the remaining MSBs, as shown in FIG. 3b.

The user supplied sequential function is translated by a programming support compiler, not shown, of a type well known in the art, which provides state word values and address assignments for state word memory 50. For states having Amax=4 branches, the compiler assigns or "fills" state words to corresponding primary address locations in respective branch address quadrants. Three-way and two-way branch states are filled into corresponding locations of other primary addresses, leaving those primary addresses with one, or two, locations unused, respectively.

Prior art sequencers waste branch addresses reserved for, but unused by, states having fewer than $2^C$ possible next states. In this invention, a state word memory 50 location not needed for branching in one state can be used for a "backfill" state, by providing input mapping circuit 20 with a quadrant control circuit 40 as shown in FIG. 2. Signals on branch number lines BN1 and BN2 are coupled through, and selectively transformed by, branch control circuit 40 to provide branch (quadrant) address bits BA6 and BA7, for example by adding two (binary 10). In one embodiment, quadrant control circuit 40 is formed by XOR gates 41 and 42. A mapping array 30 output line (BN1 or BN2) and a quadrant control feedback line (QC1 or QC2) are connected to the input lines of each XOR gate 41 and 42. For fill state addresses, the software support compiler provides state word values with logical 0 quadrant control bits for feedback lines QC1 and QC2, which cause XOR gates 41 and 42 to have no effect on branch number signals, and therefore to produce equal value branch address signals on lines BA6 and BA7. The software support compiler "backfills" partially used primary address locations with next state words for states having one or two next state branches, for which quadrant control feedback signals QC1, QC2 cause circuit 40 to transform branch number signals BN1 and BN2 in forming different value branch address signals BA6 and BA7. Thus, two states can share the same primary address, and branch on the same decision variable input condition, to the same or to different quadrant next state addresses. For unconditional branch states, the compiler provides product select signals to suppress input mapping array 30 output lines BN1 and BN2 to logical 0's, while quadrant control lines QC1 and QC2 signals control XOR gates 41 and 42 to provide unconditional "branch" address signals.

State word memory 50 in the preferred embodiment can store state words for a sequence of a maximum of 128 states with no branching (i.e., each state makes only an unconditional transition to its next state). In this event, the $2^C=4$ state word memory locations of each primary address are filled with state words for different unconditional states. At a minimum, if all or most states branch Amax=4 ways, it may not be possible for any primary address, or its set of $2^C$ corresponding memory locations, to be shared by multiple states, in which case state word memory 50 can store state words for a sequence of only 32 states. Between the two extremes of unconditional transition sequences of the maximum number of states, and Amax=4 way branch sequences of the minimum number of states, in sequences having a medium number of states with varying numbers of branches, pairs or trios of states with a total of not more than $2^C$ branches can generally use a common primary address to access memory 50 locations in different branch address quadrants. For some sequences, it may be necessary to duplicate state words at different primary address locations. For example, state A, succeeded by either state B, C, or D, and state E, succeeded by either state D, F, or G, have the next state D branch in common, but their total of 5 branches cannot be made to the 4 quadrant locations sharing the same primary address. Therefore state word D must be stored in redundant locations.

During operation of sequencer 10, unused or unfilled locations in memory 50 can only be addressed by error. To detect sequencer operation errors, unfilled memory locations can be programmed with an error recovery code of, for example logical ones for all bits, to be output on lines 55 by erroneous branches. A product select feedback signal of known value, for example 63 (binary 111111), suppresses the mapping array 30 output lines BN1 and BN2 to logical zeros, while a binary 11 quadrant control signal causes XOR gates 41 and 42 to output branch address 11, which is joined with primary address 11111 to form state word address binary 127, which enables a state word memory 50 location storing a known start or "reset" state word.

Figure 4:
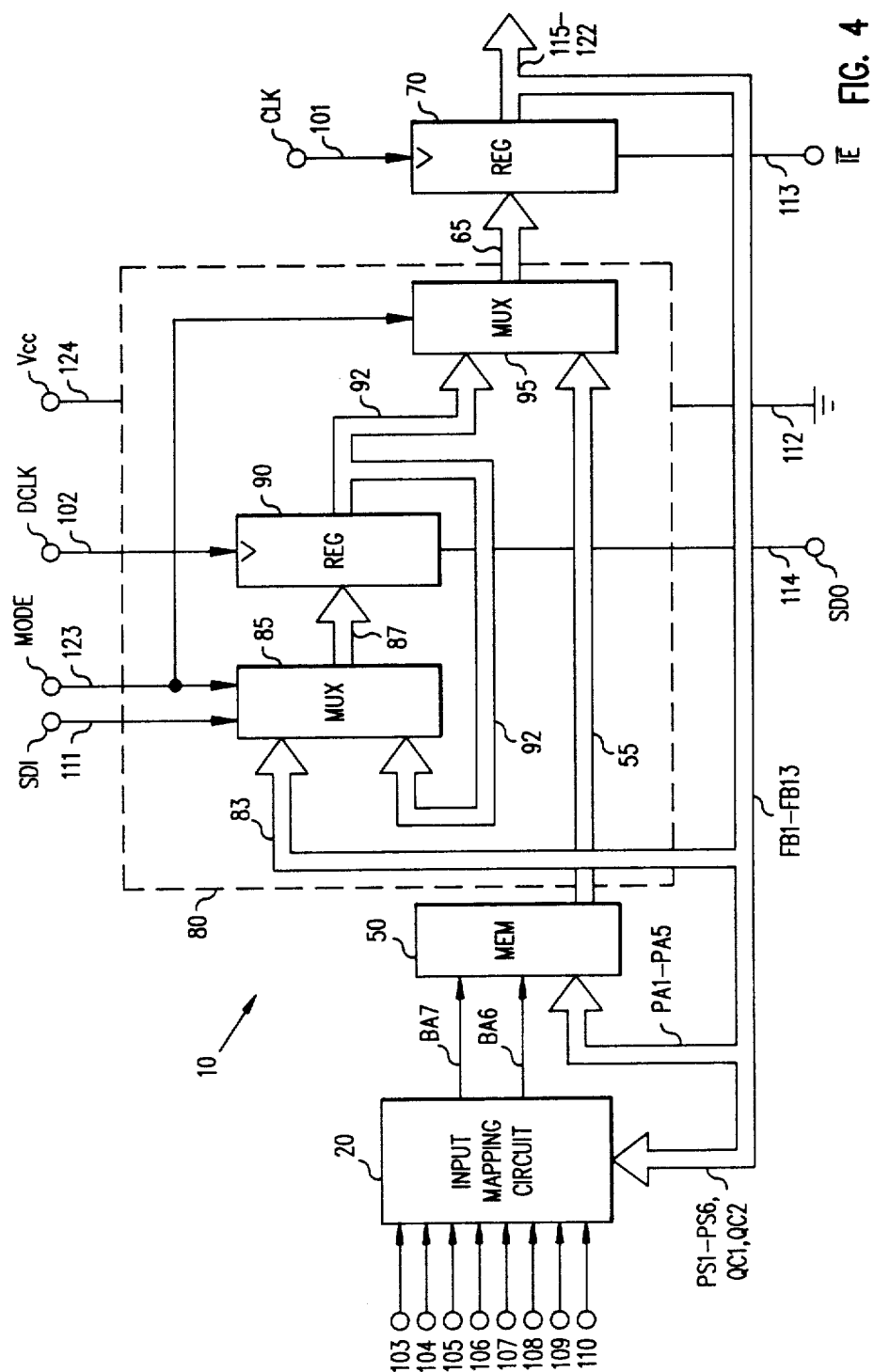
FIG. 4 is a block diagram of a preferred embodiment of the invention including a diagnostic circuit useful for programming and/or diagnosing operation of the sequencer.

Input mapping array 30 AND plane input connections and state word memory 50 OR plane input connections can be configured to program sequencer 10 during manufacture as an IC using a mask, defined by the software support program which compiles the user-supplied sequential function. Referring to FIG. 4, the preferred embodiment of sequencer 10 is programmable after manufacture by the sequential function-defined application of signals to various sequencer terminals. To program input mapping array 30 and state word memory array 50 conveniently, the preferred embodiment includes diagnostic circuit 80, in which MUX 95 is connected between memory 50 output lines 55 and the input lines 65 to output register 70. In normal programmed operation of sequencer 10, a low mode signal on line 123 causes MUX 95 to connect state word memory output lines 55 to input lines 65 of output register 70.

Referring to FIG. 4, shadow register 90 is loaded by MUX 85, and output register 70 is loaded by MUX 95, under control of the signal on mode line 123. When the mode signal is low, output register 70 is loaded on rising edges of clock signal CLK on line 101 from memory 50 output lines 55, while shadow register 90 bits are serially shifted, from serial data in (SDI) line 111 through MUX 85 and towards serial data out (SDO) line 114, on rising edges of timing signal DCLK on line 102. When the mode signal is high, output register 70 is loaded in parallel from shadow register 90, while shadow register 90 is loaded by MUX 85 via bus 83 from register 70 output lines if SDI is low, or holds the previous shadow register data if SDI is high.

State word values for state word memory 50 and product input combinations of decision variable lines for mapping array 30, address assignments, and procedures for identifying those address locations and fixing their values, are provided by a software support compiler. With these parameters, a programming machine or "programmer," of a type well known in the art, can apply signals through diagnostic circuit 80 to program or configure input mapping array 30 and state word memory 50, FIG. 4.

In alternate embodiments of the invention, state word memory 50 is another type of random access memory (RAM) such as an electrically erasable programmable read only memory (EEPROM). This allows sequencer 10 to be reprogrammed to execute different sequential functions.

Figure 5:
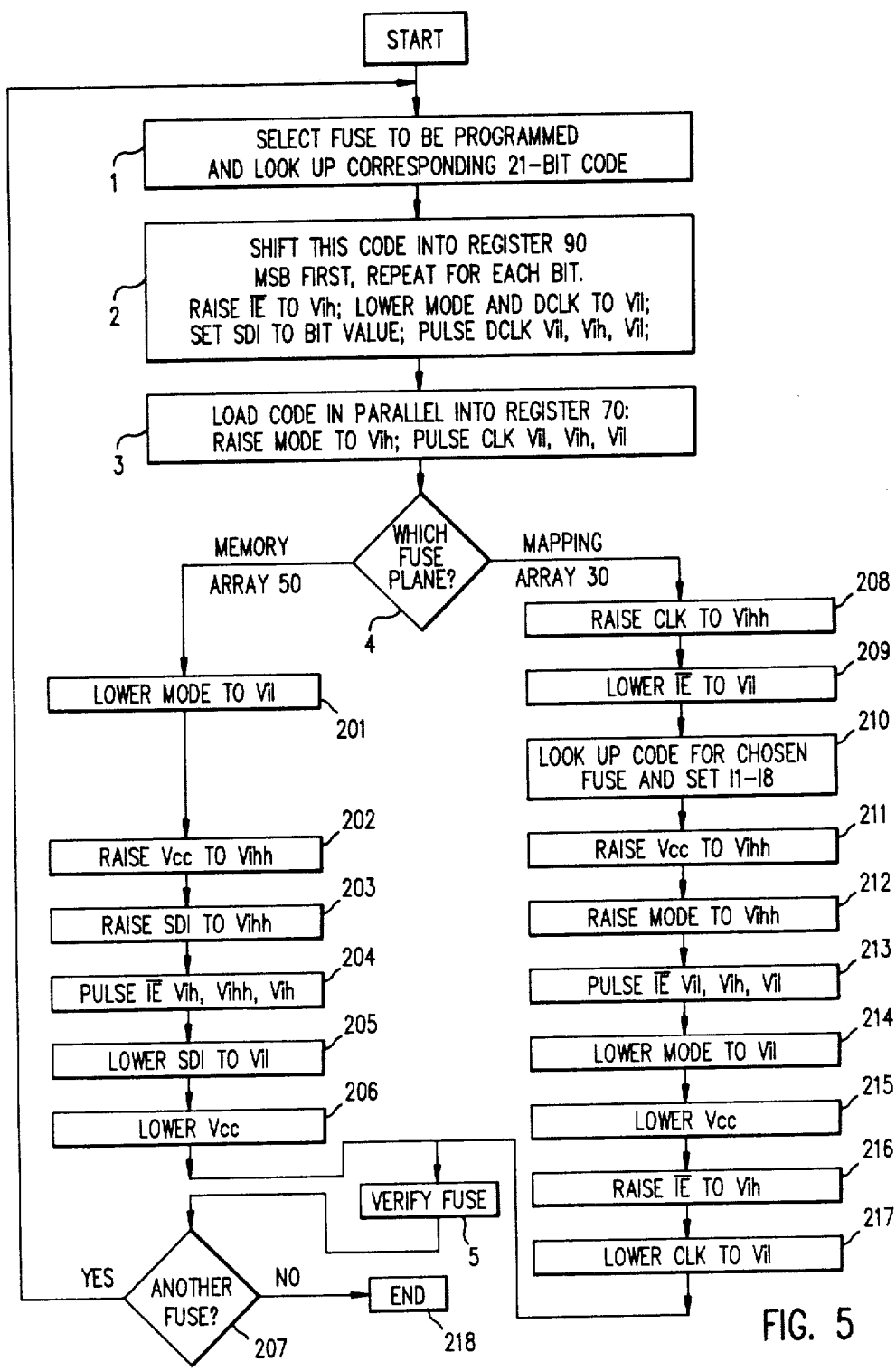
FIG. 5 is a flow chart showing one way the diagnostic circuit can be used to program the preferred fuse-array embodiment of the sequencer.

In the preferred embodiment of sequencer 10 (FIG. 4), state word memory 50 and input mapping array 30 are fuseprogrammable programmable read only memory (PROM) and programmable array logic, for example "PAL" (registered trademark of Monolithic Memories, Inc.) circuits, in which fuses, made for example of titanium-tungsten, initially in an unprogrammed low value state are program-blown to high values by an algorithm such as the one described in the flowchart of FIG. 5, for example. The programming machine selects a fuse to be programmed (step 1) and, while mode 123 is low, shifts its corresponding 21 bit code serially into shadow register 90 (step 2) from SDI line 111, through MUX 85 to the low order bit of shadow register 90 and, by successive periods of signal DCLK, around bus 92 and MUX 85 to successively higher bit positions in shadow register 90. The high order (21st) bit of shadow register 90 is output to SDO line 114. Then, with mode 123 high, in step 3 the shadow register 21 bit contents are transferred from bus 92, by a rising CLK signal, to output register 70. This signal pattern identifies the fuse to be programmed. Then, in step 4, depending on whether the fuse is in array 30 or in array 50, the programming machine executes either the procedure of the left or right column, applying a programming voltage Vihh=12 V to sequencer terminals to fix the array configurations. The programming preferably concludes with a suitable fuse programming-verification step 5. Steps 1 through 5 are repeated until all the fuses necessary are programmed.

Sequencer 10 preferably includes an architectural fuse $\overline{IE}$ with an external line 113, FIGS. 2 and 4, which can be used in its initial state for asynchronous initialization $\overline{I}$, to reset all register 70 output lines to high states, regardless of present state feedback or decision variable input values. Register 70 is also reset to high states on power-up on Vcc line 124. Alternatively, fuse $\overline{IE}$ can be programmed for asynchronous output enable $\overline{E}$.

Once programmed for operation, sequencer 10 is asynchronously initialized, or power-up reset, to starting state address 127, which provides feedback signals to form the next state address. Power-up resets register 70 output line 83 to high values. Under control of signals on lines PS1-PS6, 30 selects products of literals of decision variable input signals I1 through I8 on lines 103 through 110, and OR's the products to form a sum signal for each digit BN1 and BN2 of the branch number. Depending on signals QC1 and QC2, quadrant control circuit 40 may have no effect upon, or it may transform, branch numbers BN1, BN2, in providing branch address signals BA5, BA6, which, together with primary address bits PA1 through PA5 form the next state address from which memory 50 provides the next state word on memory output lines 55. Thus, sequencer 10 forms next state addresses and undergoes transitions through a sequence of states. With appropriate control signals shadow register 90 can be used as a one level stack to store a state word for sequencer 10 to perform a one level subroutine with no nesting.

After sequencer 10 has been programmed, its operation can be diagnosed through diagnostic circuit 80. Feedback lines internal to an IC conserve I/O pins, but are normally inaccessible for detecting the sequencer state. Nonetheless, sequencer 10 allows testing internal feedback lines FB1 through FB13 and arrays 30 and 50.

Test vectors can be loaded serially from SDI line 111 through shadow register 90 into register 70. Test results from register 70 can be output on bus 83 through MUX 85 to shadow register 90, to be shifted serially out SDO line 114, and analyzed while a new test vector may be shifted in, if desired.

The state word values at a given memory address can be verified by serially shifting into shadow register 90, and then into output register 70, a test vector pattern containing feedback signals for lines FB1 through FB13 to unconditionally form the desired next-state word address for input to state word memory 50. The state word contents can be loaded to output register 70, and back to shadow register 90 and shifted out SDO line 114.

Further details of diagnostic circuit design and operation can be found in U.S. Pat. No. 4,476,560.

A preferred embodiment has been illustrated, of which modifications and adaptions within the scope of the invention will occur to those skilled in the art. The invention is limited only by the scope of the following claims.

We claim:

1. A programmable sequencer integrated circuit which has sequencer input lines for receiving decision variable input signals from an external device a source of timing signals, and has internal feedback lines for feeding back signals including product select signals and primary address signals, and which comprises:
    a decision variable input mapping circuit including a sum of products array wherein sequencer input and sequencer input complement lines are connected in predetermined combinations to input lines of product term AND gatse in each of C sets of AND gates and wherein input mapping circuit control lines are connected to input lines of said product term AND gates in each of C sets of AND gates to provide product signals on AND gate output lines connected in each set to input lines of respective OR gates, the output of said OR gates being connected to input mapping circuit output lines;
    a state word memory for storing state words of W bits, said state word memory having state word memory output lines, branch address input lines connected to said input mapping circuit output lines and primary address input lines for receiving primary address signals;
    an output register having W input lines connected to said state word memory output lines, input mapping feedback lines connected from said output register to said input mapping circuit control lines and primary address feedback lines connected from said output register to said primary address input lines of said state word memory, said output register being responsive to a timing signal from said source of timing signals to transfer state word memory output signal values received from said state word memory to said state word output lines, to provide primary address signals over said primary address feedback lines to said primary address input lines of said state word memory.

2. A sequencer as in claim 1 wherein said input mapping feedback lines connected to said input mapping circuit control lines include product select lines connected to said some of product array and branch control lines, and wherein said input mapping circuit further includes a branch control circuit, controlled by signals recevied on said branch control lines, to transform branch number signals to provide branch address signals on respective mapping circuit output lines.

3. A sequencer as in claim 2 wherein the branch control circuit comprises C exclusive OR gates each having one input line connected to a respective branch number output line of said or gates, a second input line connected to a respective branch control line, and an output line connected to provide branch address signals on a mapping circuit output line.

4. A sequencer as in claim 1 wherein the input mapping circuit and the state word memory are programmable during manufacture of the sequencer.

5. A sequencer in claim 1 further comprising a diagnostic circuit having mode control input lines and timing signal input lines for receiving signals from external sources, said diagnostic circuit being responsive to signals on mode control input lines and timing signal input lines, to select signals from a serial data input line, connected to an external source of serial data has for loading said serial data into the output register to program the input mapping circuit and to program the state word memory after manufacture of the sequencer or to diagnose operation of the programmed sequencer.

* * * * *